May 10, 1966  J. J. C. GARATE  3,250,239
AMPHIBIOUS VEHICLES
Filed Jan. 20, 1964  8 Sheets-Sheet 1

INVENTOR
JUAN JOSE CHICO GARATE
BY
Imirie & Smiley
ATTORNEYS

May 10, 1966     J. J. C. GARATE     3,250,239

AMPHIBIOUS VEHICLES

Filed Jan. 20, 1964     8 Sheets-Sheet 2

INVENTOR
JUAN JOSE CHICO GARATE

BY
ATTORNEYS

May 10, 1966  J. J. C. GARATE  3,250,239
AMPHIBIOUS VEHICLES

Filed Jan. 20, 1964  8 Sheets-Sheet 7

INVENTOR
JUAN JOSE CHICO GARATE

BY *Smiley*
ATTORNEYS

May 10, 1966   J. J. C. GARATE   3,250,239
AMPHIBIOUS VEHICLES
Filed Jan. 20, 1964   8 Sheets-Sheet 8

INVENTOR
JUAN JOSE CHICO GARATE
BY
ATTORNEYS

United States Patent Office 3,250,239
Patented May 10, 1966

3,250,239
AMPHIBIOUS VEHICLES
Juan José Chico Garate, Ibiza 66-1-D, Madrid, Spain
Filed Jan. 20, 1964, Ser. No. 339,027
21 Claims. (Cl. 115—1)

The present invention refers to improvements in amphibious vehicles, and a purpose of these improvements is to achieve a vehicle capable of movement on water as on solid ground, and also on soils of intermediate consistency, such as mud.

Another purpose of the invention is to obtain a propulsion means which can be adapted, by orientating its rotation shafts, to the diverse running conditions imposed by the nature of the soil, by the course direction, or both simultaneously.

Another aim of the invention is to attain an orientation of the propelling thrusts in the optimal manner in order to attain the best propelling efficiency.

According to this invention, the propulsion of the vehicle is provided by means of four rotors, of Archimedean screw pattern, whose turning shafts are orientable, in the manner to be explained later.

According to this latter feature, another purpose of the invention is to provide means for each rotor supporting strut to turn around its own geometrical axis, parallel to the symmetry plane of the vehicle.

Also it is an object of these improvements, to provide means by which the rotor supporting struts can be expanded longitudinally.

Another aim of this invention is to establish an ensemble of means which automatically will determine the orientation of the rotor turning shafts, in order that the resultant radial and axial thrusts will be parallel in both rotors of each two rotor pairs, forward and rear.

It is a further object of this invention to provide manually actuated means which, in connection with those before mentioned, will permit to the varying at will of the angle between the resultant thrusts of the forward and rear rotor pairs, respectively, in order to steer the vehicle.

Yet another object of this invention is to provide the means by which the use of pneumatic tires on the edges of the helicoidal surface of each rotor is possible, in order to move on grounds of certain hardness. In this connection there is also provided a device by which the withdrawal of the pneumatic rim is permitted, if the nature of the soil (e.g. ice, frozen snow or also some kinds of sandy ground) will make advisable to have a hard or cutting edge in the rim of the helicoidal fins of the rotors.

A vehicle according to the invention is a tractor vehicle, usable in such diverse soils as mud, sand, gravel, snow, ice, and also capable of cruising on waters.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
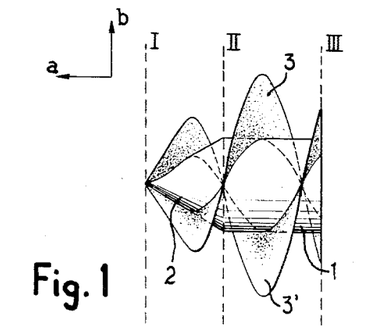
FIGURE 1 shows schematically, in side view, a part of the Archimedean screw, including the point end of the same, also denoting, by means of the vectors $a$ and $b$, the longitudinal and transversal forces raised by the turning motion of the screw.
Figure 2:
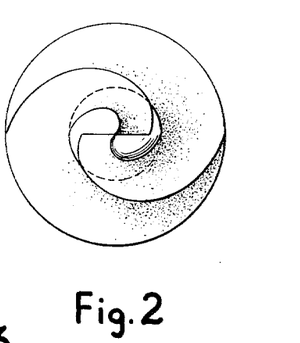
FIGURE 2 is a front view of the same screw, from its point end.
Figure 3:
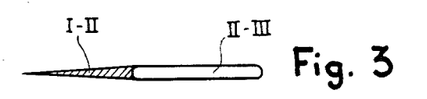
FIGURE 3 shows the fin rim development, according to FIG. 1.

The vehicle described uses as propelling elements four rotors, which are represented in FIGS. 1, 2 and 3.

The rotors are constituted by a nucleus 1, cylindrical between the sections II and III, and pointed, in conic or ogival form, 2, between sections I and II. On this nucleus are wound two helicoidal fins, or Archimedean screws, 3 and 3'; whose outer radius increases logarithmically from I to II, being constant from II to III. The pitch of the helicoidal fins is constant; being from II to III a little more than half a thread step.

Figure 24:
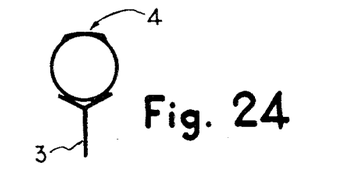
FIGURE 24 is a partial sectional view the zone II–III of the FIG. 1 in which zone a suitable pneumatic tire may be adapted to the outer rim of the helicoidal fin in the Archimedean screw. This section is denoted by line 24—24 in the FIG. 25.
Figure 25:
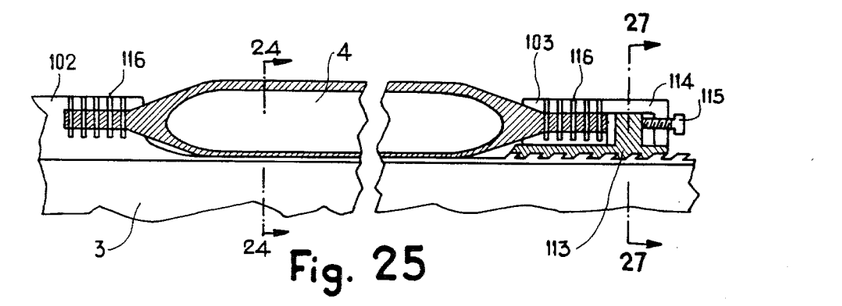
FIGURE 25 is a longitudinal section, along the pneumatic tire, also along the developed helicoidal fin of the rotor.
Figure 26:
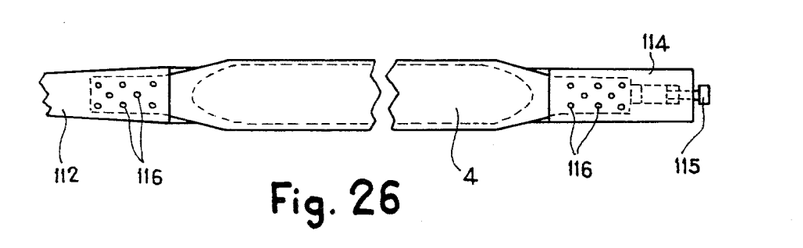
FIGURE 26 is analogous to FIG. 3, but incorporating the pneumatic tire.
Figure 27:
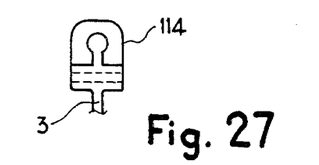
FIGURE 27 is a section taken on line 27—27 of the FIG. 25.
Figure 28:
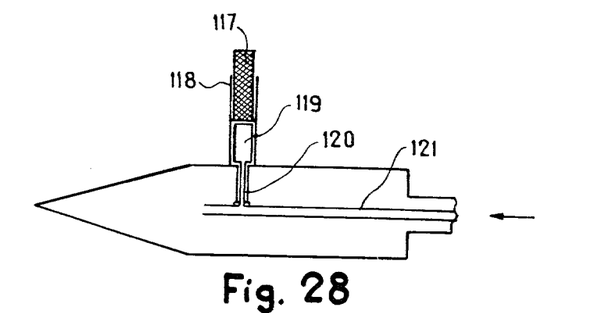
FIGURE 28 is a longitudinal section of the rotor, with a quasi-transversal section of the helicoidal fin and pneumatic tire, explaining schematically a manner in which the pneumatic tire can be telescopically protruded from the rim or retracted.

In order to run upon hard ground, a pneumatic tube and tire 4 can be arranged, somewhat as in ordinary cars and as shown in FIG. 24; which shows a transverse section to the rim, or the outer edge of the fin as represented in FIG. 3. The part of the fin corresponding to the rim from I until a little before II is of growing radius, but without reaching the greatest value; and with growing thickness, until reaching the corresponding thickness of the pneumatic tire in the rim; it can be made of steel or other hard metal or alloy. The part of the fin with even thickness represents the expansion of the rim of constant radius, namely, from II to III, which is the part bearing upon the hard ground and provided with a tire, as used in ordinary cars except in being not closed upon itself in toroidal form, but a segment of a helix, as explained hereinafter.

It is not new to apply the helicoid or Archimedean screw as propeller of amphibious vehicles and tractors, and for snow, mud, or otherwise soft ground. The main inconvenience found in this employment is that, when the propellers were totally submerged in water or mud, the thrust was obtained in axial direction, whereas in case of part immersion a lateral component appears, normal to the axial component and the magnitude of which varies with the nature of the ground, the entire thrust being in this lateral direction in the case of hard surfaces.

The solution hitherto used was the employment of two parallel rotors turning in opposite sense, and with helicoidal fins wound also in opposite sense, in such a way that the lateral components of the thrust were cancelled out. This reduces, of course, the propulsive efficiency in proportion to the lateral component of the thrust, until practically reached a zero value in case of movement on hard ground.

In the vehicle of the present invention, the screw, the edges of 3 and 3', in the parts included between II and III, allows them to roll on hard ground, obtaining a thrust normal to the axis of rotation (in direction $b$) whereas when rotating completely submerged in water of mud, the thrust is obtained in axial direction, that is to say, along $a$.

Thus the solution employed in the present invention to avoid the mentioned disadvantages, lie in the use of four rotors, arranged in such a way that their thrusts can be oriented always in parallel direction, in order to move in a straight line, or parallel for each forward and aft pair, in order to turn round.

Figure 4:
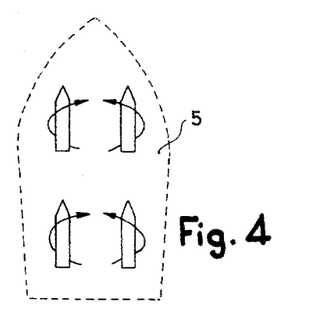
FIGURES 4 and 5 are two underside views of a vehicle, according to this invention, with the propelling rotors placed in longitudinal and athwart direction, respectively.
Figure 6:
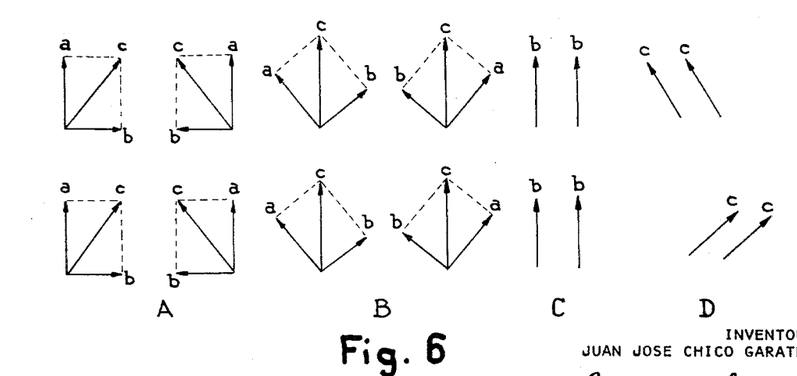
FIGURE 6 explains the vector composition of the axial and lateral thrusts on the rotors, in four diverse working conditions.

In the FIG. 4, the rotors on the left have the helicoidal fins wound in a sense, and the rotors on the right in the opposite sense, turning also in the opposite sense to each other, as indicated in the figure. In the FIG. 6, are indicated with $a$ and $b$ the axial and lateral components of the obtained thrust, and with $c$ the resultant thrust. (If the rotors are totally submerged, the components $b$ vanish.) The resultant force of each rotor is parallel to the symmetry plane (corresponding to FIG. 4) is represented as $a$. Turning of the rotors about vertical axis, as explained hereafter, results in the parallel orientation of the four resultant thrusts (FIG. 6B). In hard grounds there are only the components $b$ (FIG. 6C). In order to turn round the vehicle, the thrusts of the forward and rear rotors are oriented in the manner indicated in the FIG. 6D.

The realization of a vehicle as previously described, can be performed as follows, in outline and as an example, because there are many possible mechanical designs.

Figure 7:
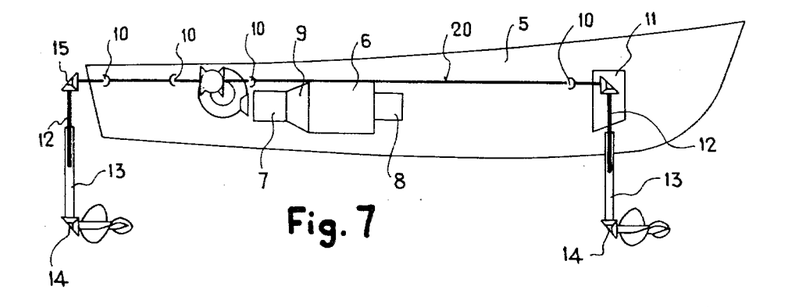
FIGURE 7 is a schematic side elevation of a vehicle according to the invention.
Figure 8:
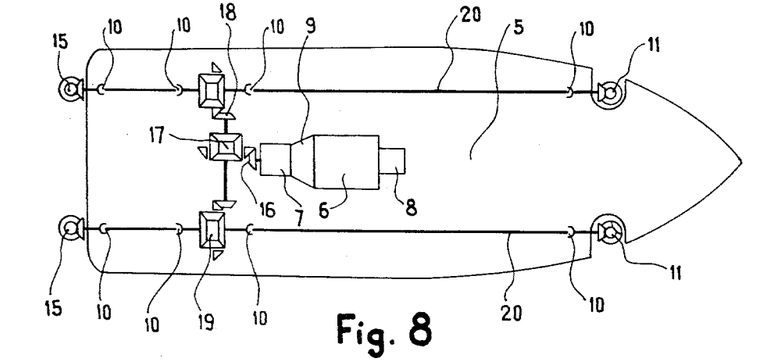
FIGURES 8 and 9 are a plan and a front view, respectively, of the same vehicle.
Figure 9:
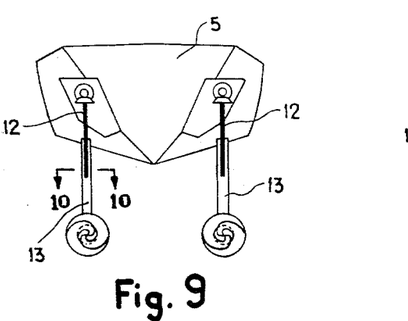
Figure 10:
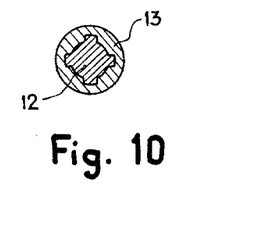
FIGURE 10 is a detail of the section taken on line 10—10 of the FIG. 9.

In the FIGS. 7, 8 and 9 is represented schematically the mechanical drive of the rotors, omitting, for clarity's sake, the other devices such as steering, damping and supporting mechanisms, which are later described. 6 is an engine, petrol or diesel, which, by means of a conventional clutch, contained in 9, and through a gearbox, also of conventional type, represented as 7, drives the conical pinion 16 which moves the outer wheel of the differential gear 17, from which protrudes two shafts, towards both sides. Each of both shafts acts on a conical gear 18 moving the two differential gears 19 from which protrudes two shafts 20 that, through two Cardan or similar couplings, 10, and the conical gears 11 drive the shafts 12. These shafts 12 are telescopically coupled to the shafts 13 in such a way that they can slide axially with respect to each other. In order to transmit the driving couple, the shafts 12 and 13 are quill coupled as shown in the FIG. 10.

The shafts 13, by means of conical gears 14, drive the rotors which are built as already explained.

Opposite shafts 20 are two shafts of smaller length, that similarly drive the two stern rotor conical gears 15. With the arrangement sketched, the port rotors turn in opposite sense to rotation of the starboard rotors, when their axes are in the positions represented in said figures; namely, lengthwise with the tapered ends forward. The four rotors are employed only for the propulsion, the buoyancy being obtained with a conventional hull or vessel 5. When the craft is running in open waters, at sufficient speed, it can take a trim such as to make the two forward rotors emerge totally from the water.

When this happens it is advisable to brake the forward wheels of the differential gears 19, in such a way as to duplicate the rotating speed of the rear rotors, which otherwise will absorb all the power.

In order to avoid that rotors have a tendency to sink more and more when running on mud, it will be convenient that the centre of gravity of the craft remains nearer to the stern rotors than to the bow rotors.

The engine 6 is coupled to an air compressor 8, which holds at constant pressure an air reservoir (not shown in the figures) serving the steering and regulation devices later described.

The mechanical drive before described can be replaced by a hydraulic drive, with hydraulic pumps and motors, directly coupled to the shaft of each rotor, or by an electric or pneumatic drive, or also by employing an opposed piston gas generator, instead of the engine, and conducting the gas to four turbines also coupled, by means of a suitable reduction gear, one to each rotor. By these means can be obtained greater working flexibility.

Figures 11, 12:
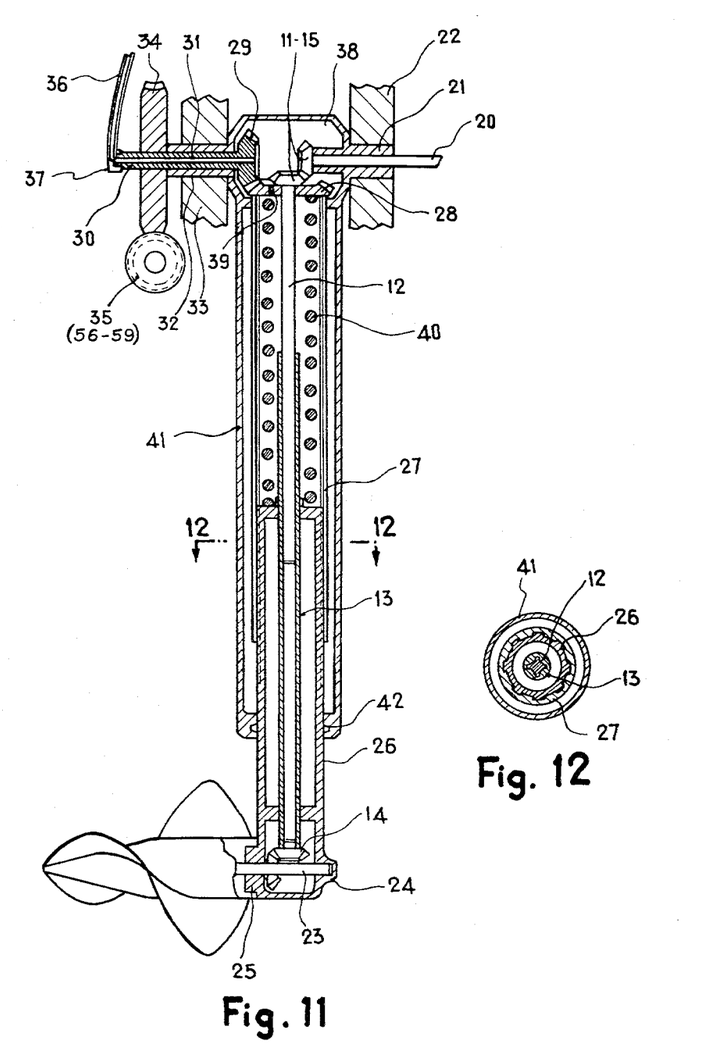
FIGURE 11 is a longitudinal section of the power drive of a rotor and the aggregate of supporting structure.
FIGURE 12 shows the transverse section taken on line 12—12 of the FIG. 11.

In the FIG. 11 is represented in more detailed form the supporting strut in which the propelling rotors are mounted. The turning motion of the rotors around their own axes is obtained by the mechanical drive just described, from which in this figure appear the shaft 20, the conical gears 11–15, the quill shafts 12 and 13 (with inner and outer slots and fins, respectively), and the conical gear 14.

The rotor shaft 23 is journalled in the bearings 24 and 25, located in the lower end of the cylinder 26, these bearings serving also to fix the direction of the rotor axis. This is accomplished in the following manner: This cylinder 26 slides axially into the cylinder 27, but the relative turning motion is prevented by slots and fins along the outer side of 26 and along the inner side of 27, as can be seen in the section of FIG. 12. The telescopic sliding motion under bias of spring 40 enables relative vertical movements of the craft with respect to the rotor; while the slots and fins, along the mating surfaces of the cylinders 26 and 27 determine the orientation of the rotor by means of the joint turning motion of 26 and 27. Both cylinders 26 and 27 are driven by the conical gear formed by the pinion 29 and the wheel 28. The pinion 29 causes the motion which orientates the rotor, motion that it receives from the worm gear 34, 35 through the shaft 30. This shaft 30 on which are rigidly mounted the wheel 34 and the conical pinion 29, is coaxial with 20, and also with the trunnions 21 and 32, located and rotating in the bearings 22 and 33. These bearings are rigidly fixed to the hull or chassis of the vehicle or craft, being part of its structure. The direction of the geometrical axis of 20 and of 30 is horizontal, parallel to the longitudinal symmetry plane of the craft. The worm 35 is a part of the steering mechanism of the vehicle, hereafter described.

In order to regulate the inclination of the vehicle, when running on uneven or scragged ground the total length of the supporting strut of the rotor, is modified in the following manner:

For a determined weight on the rotor, which will be a function of the vehicle weight, and of the relative situation of the vehicle center of gravity with respect to the rotors—besides of other dynamic effects—there will be an equilibrium position, determined by the elastic modulus of the spring 40, and this position will determine the distance between the axes 20 and 23.

In order to avoid excessive list of the craft, this distance can be altered in the following manner: through the piping 36, and the gland 37, the bore 31 in the shaft 30, and the bores 39, compressed air is injected into the cylinder 27, thereby, and depending on the corresponding pressure increase, shifting axially the cylinder 26, thus increasing the distance between the axes 20 and 23. The packing 42 prevents the compressed air from escaping between the strut outer covering cylinder 41 and the cylinder 26.

This extension of the rotor supporting strut, will be proportional to the inner pressure in the cylinder 27, within the limits of linearity of the spring 40. In order to regulate this pressure, several procedures can be utilized, one of them, although with the disadvantage of producing perhaps too much air losses, is to leave a small hole opened in the cylindrical cover 41; altering the section of air passage in the regulating device later described. If this section is very small compared with the area of the hole in the cylinder 41, the inner pressure in the later will be nearly the atmospheric pressure, and if the section of the mentioned air passage is much greater than the area of the hole in 41, the inner pressure in 27 will reach nearly the pressure in the compressed air reservoir connected to the compressor 8 of the FIGS. 7 and 8. Therefore by regulating the section of the passage of air, the pressure in 27 will be regulated and also the distance between 20 and 23.

Figure 5:
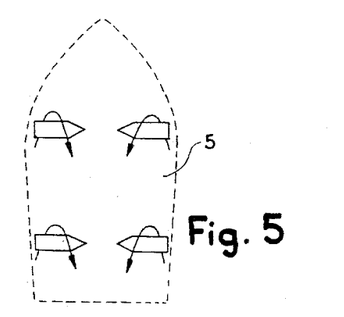
Figure 13:
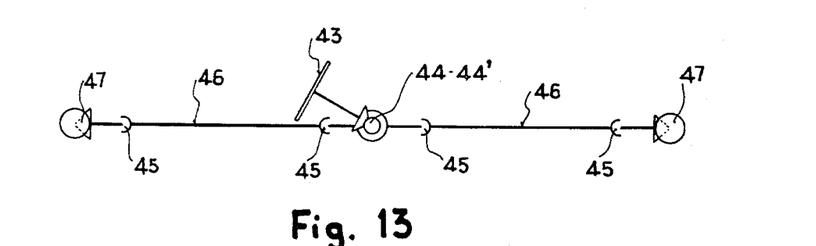
FIGURES 13 and 14 are two diagrammatic sections taken on line 13—13 and 14—14 respectively of FIG. 15, showing two particulars of the mechanical means serving to orientate the rotors.
Figure 14:
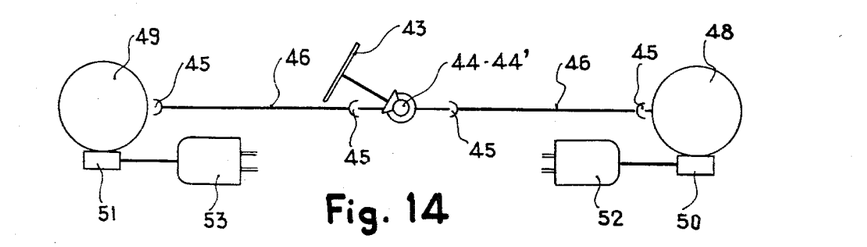
Figure 15:
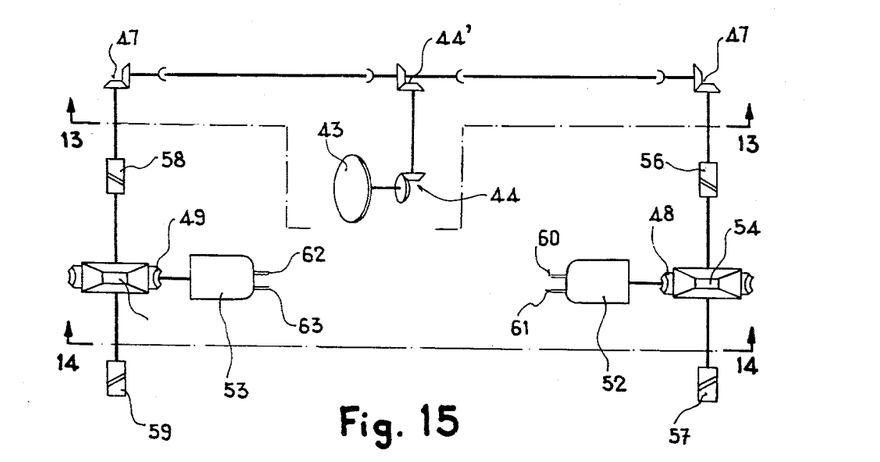
FIGURE 15 is a plan view, also schematically, of the same arrangement shown in the two foregoing figures.

*Orientating mechanism of the rotors.*—This mechanism has a double aim. Firstly it will change the relative orientation of the rotors according to the hardness of the ground and to the immersion of the rotors, in such a way that when varying the lateral component $b$ of the thrust, with regard to the axial component $a$, the resultant thrust $c$ will be maintained in the desired direction, that is, forward, if it is desired to advance in a straight line, (FIG. 6B). For this purpose, if the craft passes from hard soil to water or fluid mud, in which the rotors will be totally submerged, the rotors will be orientated longitudinally of the craft and rotate in opposed sense for the port and starboard rotors (FIG. 4). To move on hard ground, the rotors will be orientated at right angles to the craft in the positions shown in FIG. 5, the sense of rotation around their own axes will be now the same, as can be seen in the figure. If we desire, moreover, to turn the vehicle, in order to steer it, we must superimpose another motion to the one just described, in such a way that the resulting thrusts $c$ will take a direction as represented in the FIG. 6D, that is to say, we have to turn the forward rotors a certain angle, and the rear rotors another one, in opposite sense. The latter angle may be equal in magnitude to the former, although this is not essential. Such turning is obtained by means of the mechanism next described (FIGS. 13, 14 and 15). The worms 35 of the FIGURE 11 corresponding to port side, are threaded in opposite sense as those corresponding to starboard side and are indicated for different numeral references, that is: 56 and 58, for example, right hand; 57 and 59 left hand. The function of the worms 35, as already described is to orientate the direction of the rotor axis.

The way in which turning motions are governed is now set forth. The steering wheel 43 acts on the conical gears 44, 44' and 47 (on the latter, through the shafts 46 provided with Cardan articulated couplings 45), moving the worm 56 in one sense, and the worm 57 in the opposite sense (when the pinion-carrier wheel of the differential gear 54 is at rest) but, as 57 is threaded in the opposite sense as 56, the turning motion of the wheels 34 of the FIG. 11 will be in the same sense for the two forward rotors, being both parallel oriented; the two rear rotors, for the same reasons, will be also parallel oriented, but in opposite sense (since the arrangement of the forward and rear conical gears 47 makes the worm 58 to turn in opposite sense to 56—both threaded in the same sense—and therefore 59 in opposite sense to 57, when the wheels 48 and 49 are at rest). Each one of these four worms 56, 57, 58 and 59 is coupled to one of the four supporting pods of the vehicle, as represented in FIG. 11, all of them equal, with the only difference that in two of them worm wheels 34 are machined to mesh with right-hand threaded worms (57 and 59), whereas in the other two the teeth of worm-wheels 34 are apt to mesh with left-hand worms (56 and 59).

A, perhaps, good combination can also be made with a pair of conventional wheels instead the two forward rotors, in order to steer the vehicle, and the two rear rotors, as described, in order to propel it.

Figure 16:
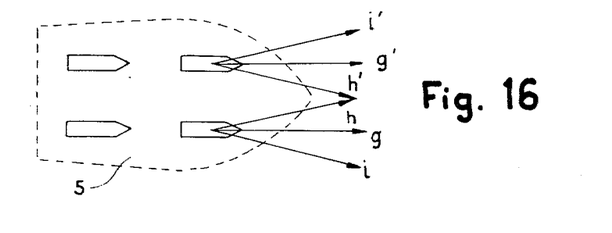
FIGURE 16 is a plan view of the vehicle showing the thrust on the two forward rotors.

Besides the steering function just described, the mechanism shown in FIGS. 13, 14 and 15 has also the function of maintaining parallel the resultant thrusts of each rotor. Let us suppose that the vehicle advances in straight line on a fluid (FIG. 16), therefore being the rotors totally submerged. The thrusts $g$ and $g'$ of the forward rotors will be obtained with their axis oriented lengthwise, therefore parallel. Now, let us suppose the craft finds a harder soil, or strikes ground with the rotors. Then, there will appear transversal components which will shift the direction of the thrusts, now being $h$ and $h'$, and becoming convergents, or divergents, according to the respective sense of turning and of winding of the helicoidal fins. (Since, as the rotors turn in opposite sense the transversal components of the thrusts will have also in this case opposite sense.) Now, if we remember that the supporting struts can rotate, on their trunnions 21 and 32, located on the bearings 22 and 33 (FIG. 11) rigidly fixed to the hull or chassis of the craft, it will follow that the lack of parallelism of the thrusts will result in forces on the struts tending to expand or compress the tie bar 66–67 of the FIGURE 17. This bar is fastened to the struts by means of the links 64 and 65 provided with horizontal bolts. The two halves of the bar are coupled by means of a double piston 69–73, in one of them, and a cylinder 68 in the other, forming an air slide-valve. The relative shifting of the two parts of the tie bar is limited by the mating contact of the bar end 66 and the butt surface 74 in case of compression, or by the contact between the butt-ends 71–72 with the inner sides of the ends of the cylindrical cover 76. In absence of other forces, the slide valve is maintained in its middle position by the spring 70, which is firmly fixed at its ends to parts 71, 72 and opposes lengthening as well as shortening of the tie-bar.

The compressed air coming from the reservoir enters through the flexible ducting 79, being conducted to the inlet 75 of the slide valve. When the rotor thrusts are parallel, and there is neither an extension nor compression of the tie-bar 66–67, the slide valve shuts the air passage 75, but when the thrusts converge ($h$–$h'$ of the FIG. 16) or diverge ($i$–$i'$) as result of having changed the immersion of the rotors, the tie-bar 66–67 of the FIG. 17 will suffer a compression or an extension, respectively, and the slide-valve will permit passage of the compressed air through the outlets 77 or 78, connected respectively to the ductings 80 and 81. These ducts are continued to the motor 52 of the FIGS. 14 and 15, entering through 60 and 61, respectively. The motor 52 is a conventional pneumatic motor, turning in one sense when receiving the compressed air through the duct 60, and in opposite sense when the air enters through 61.

Figure 17:
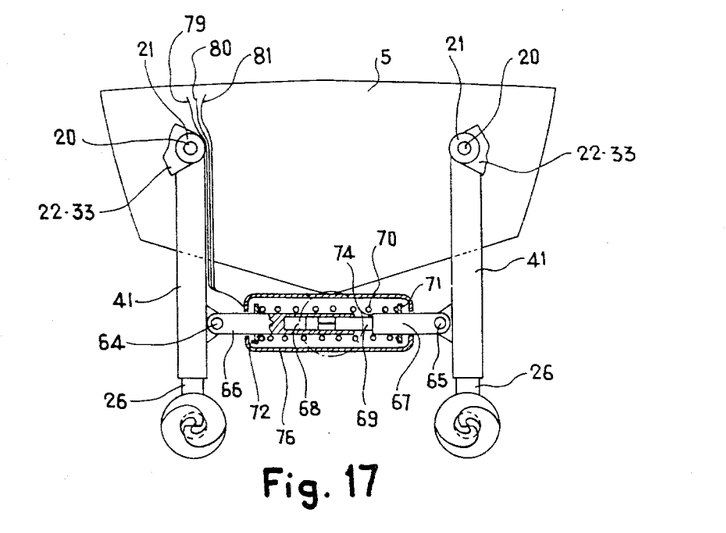
FIGURE 17 shows schematically a front elevation of the device to control automatically the orientation of the forward rotor pair, in order to vary their convergency according to the athwart thrusts on them.
Figure 18:
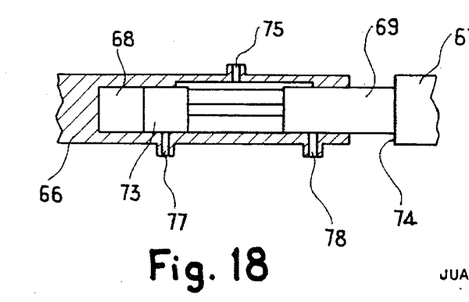
FIGURE 18 is an enlarged view of that part enclosed in a broken line circle in the FIG. 17.

The motor 52 moves to worm 50, FIG. 14 and this worm turns the pinion carrier wheel 48 of the differential gear 54, in such a way as to turn the worms 56 and 57 in the same sense; but, as already explained, the worms are threaded in opposite sense to each other, and the supporting struts of the rotors turn also in opposite sense, so chosen as to cancel out the convergence or divergence of the thrusts, until the slide valve of the FIGS. 17 and 18 reaches its central position which corresponds to parallel thrusts, thus shutting off the passage of air. A similar mechanism takes care of the parallelism of the rear rotors. Let it be observed that when the steering mechanism alters the orientation of the rotors, the thrusts of the two forward rotors never fail to remain parallel as does the thrusts of the two rear rotors. The regulation just described may be also performed by other means, as for example by an electric or hydraulic drive.

Figure 19:
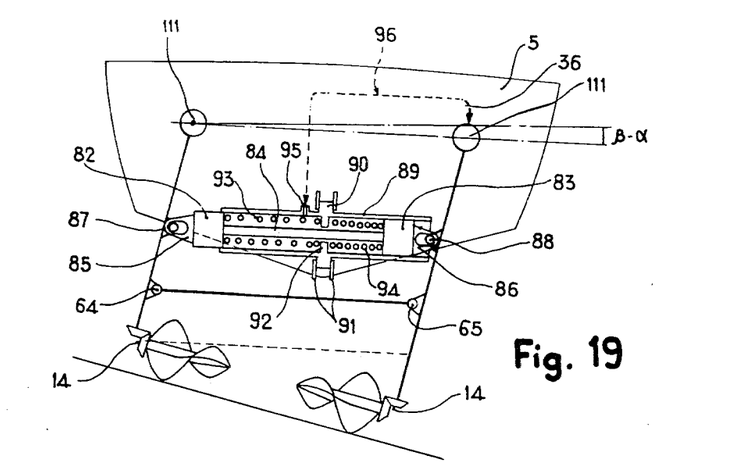
FIGURE 19 shows a schematic elevation of the device arrangement which permits regulation of the lateral inclination of the rotor supporting struts, that is, the inclination with regard to the symmetry plane of the vehicle.

*Stabilization device.*—If the vehicle has to run on uneven or inclined ground, a device is utilized which, within certain limits partly cancels the list, decreasing it to a fraction of its initial value. In FIG. 19 showing a schematic frontal view of the craft, 111 represents the axis of gyration of the rotor supporting struts, and 64–65 the tie bar which serves to regulate the parallelism of the thrusts, as already explained.

If there were no additional element, the articulated parallelogram 111–64–65–111 could not sustain the vehicle, there being no forces present which will cause it to adopt a determined shape, and the craft would not rest in a stable way upon the ground.

Therefore bar 87–88 is arranged as part of the stabilization system. This bar is also articulated to the outer cylindrical cover of the rotor supporting struts (that is to say, to the cylinders 41). The links of this articulation, not-withstanding, have a clearance slightly greater than the stroke of the slide valve in the bar 66–67 (FIG. 17) in order that the convergency or divergency of the thrusts, formerly mentioned, will act always on the slide valve, and on the regulating system described.

The bar 87–88 in the FIG. 19 is formed by two pistons 82 and 83; rigidly connected by the rod 84. The cylinder 89 covers these pistons, having inside, at its center, a wall 92 subdividing it in two halves. The rod 84 passes through a central hole made in the wall 92, but this passage is made airtight by means of a suitable packing. The twin springs 93 and 94 hold the cylinder 89 in a central position, symmetrical between the pistons 82 and 83. In the outer side, at a central position, the cylinder 89 bears a rim 90 that fits and slides in the rails 91 fixed at the hull of the craft in the symmetry plane. In such a way, in absence of other forces, the two struts of the rotors, represented in the figure by the straight lines 14–111, are fixed to the hull (except by the small play left by the clearance of the links 87 and 88). Now let us suppose that air under pressure is introduced by a duct 95 into the part of the cylinder 89 at the left side of the figure (namely, that limited by the piston 82, and containing the spring 93). Then the rod 87–88 will be displaced also in the same sense with respect to the hull of the craft, the spring 93 being expanded and the piston 82 moved away from the symmetry plane. In the FIG. 20 $jj'$ is the trace line of the symmetry plane, $gj$ the stroke of the piston 82 from its equilibrium position, equal to the length increase of the spring 93 (and the length decrease of the spring 94), and $\alpha$ the angle which will be formed between the struts $tu$ and $t'u'$ (111–14) and the symmetry plane. Within the limits of linearity of the springs, this stroke will be proportional to the pressure inside the cylinder.

Now let us suppose we introduce air at the same pressure into the strut $tu$ as through the duct 96. The length $tu$ will be increased proportional to this pressure. Now, if we select the elastic modulus of the spring 40 (FIG. 11) and 93–94 (FIG. 19) and the areas of the pistons 26 (FIG. 11) and 82–83 (FIG. 19) in such a way that, for the same pressure, length increases $\overline{gj}=\overline{td}$ sine $\alpha$ and $\overline{un}=\overline{tt'}$ sine $\alpha$ will be produced (FIG. 20, $$\overline{t'e}=\overline{gj'}=\overline{td}$$

Figure 20:
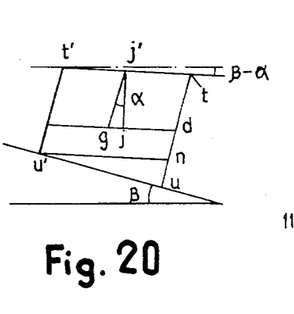
FIGURE 20 explains a geometrical relation of the vehicle inclination angles.

$\overline{u'n}=\overline{ed}=\overline{tt'}$), it will result that the line $uu'$, trace of the plane in which are situated the axis of the craft, (normal to the symmetry plane) and, also, the axis of the rotors, will continue parallel to the ground direction (if the ground is even, although inclined), as is advisable in order to roll suitably, without the jumps or discontinuities that the helix form of the rotor rim would produce if the turning axis were not parallel to the ground. This angle, $\alpha$, can cancel a fraction of the $\beta$ angle of ground inclination (not the whole, in order to permit the working of the regulating system later described), leaving the deck or platform inclined only in an angle $\beta-\alpha$ necessary in order to act on the regulating mechanism.

Figures 21, 22:
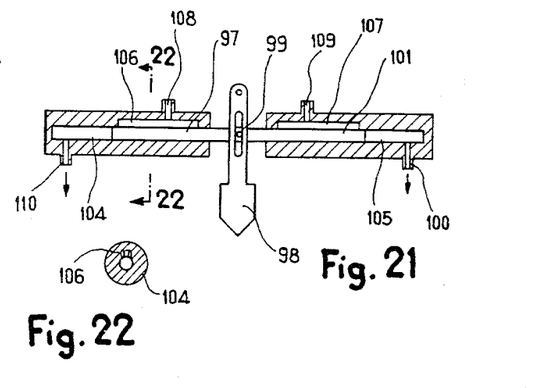
FIGURE 21 is a diagrammatic sectional view of a stabilizing control device for automatically controlling roll of the vehicle.
FIGURE 22 is the section taken on line 22—22 of FIG. 21.
Figure 23:
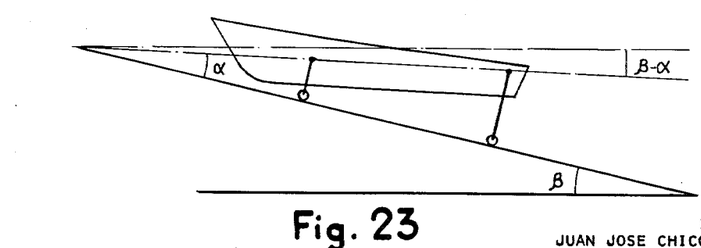
FIGURE 23 explains the geometrical relations of the angles in case of longitudinal inclinations, referred to the symmetry plane of the vehicle.

This mechanism is shown in FIG. 21. A pendulum 98 obeys to the inclination $\beta-\alpha$ of the vehicle platform, shifting, by means of the pivot 99, the pistons 97, 101 along the cylinders 104, 105. When the craft tilts in the sense shown in the FIG. 19, the piston 97 will be drawn to the right of the figure, thus uncovering the slot 106, through which finds its way the compressed air coming from the previously mentioned reservoir, through the ducting 108; the greater is the inclination, the greater will be the passage sectional area. The section of the slot 106 increases towards 108. The air continues through 110 (FIG. 21) to the ductings 95, 96 (and 36) previously mentioned (FIG. 19) there producing the shiftings firstly explained. Obviously, the pair of rear rotors ought to have a mechanism exactly similar to that represented in FIG. 19, to which would come the same ducting. The pendulum, as the sensitive element, can be replaced by a gyroscope, or a gyroscopically stabilized platform. The gyroscope would not be sensible, as is the pendulum, to the dynamic effects; e.g., in a curve the pendulum would make the vehicle platform to take an orientation near to the relative horizontal; that is, normal to the relative vertical, or the resultant of the gravitational acceleration and the inertial relative acceleration; whereas the gyroscope would not react to this relative acceleration.

For longitudinal stabilization, another pendulum, exactly like the pendulum shown in FIG. 21 can be used, but oscillating in a longitudinal plane, with the only difference that the ductings 110 and 100 would be connected to the inlets 36 (FIG. 11) corresponding to the rear and forward rotors, respectively. So would be attained length increases of the struts which would hold the vehicle, in a position nearly horizontal even if the ground were longitudinally inclined. Likewise, also in this case the pendulum could be replaced by a gyroscope or system of gyroscopes; also in this case the gyroscope would not react to the inertial forces (acceleration or braking) which, in the case of the pendulum, would make the vehicle take an additional inclination.

In the FIGURES 24, 25, 26 and 27 are shown a scheme for arrangement of a pneumatic damping chamber. By 4 is denoted a tubeless tire, whose free ends are closed and reinforced in order to be fixed along the rim of the corresponding helicoidal fin. The development of the fin is represented in the figures. These ends can be fixed and secured by means of bolts or pins 116 to parts such as 102 and 103, the latter of which can slide a certain length in order to permit the regulation of the final strain acting on the said chamber 4. A regulating device, such as the screw 115, acts upon a flange 114, of the part 103. These parts are mounted on the slots of 113, fixed to 3. In this manner the tire can be secured, before being inflated.

By 112 is denoted the part corresponding to I–II in FIG. 3.

In some cases it can happen that the nature of the ground, if it is slippery (ice, frozen snow) makes it advisable to have a hard and cutting edge in the helicoidal fins, but in order to move on non slippery ground it would be advisable, notwithstanding, to have a greater bearing area and an adherent surface, provided with pneumatic damping. In such cases the arrangement shown in the FIGS. 28 to 31 can be adopted.

In these figures, 117 is a rubber part, of similar quality as used in ordinary tires, 118 are two rigid helicoidal walls within which the part 117 can slide in and out. By 119 is denoted an air chamber which, when full of compressed air, forces the part 117 to take the position shown in FIGS. 28 and 29.

When advancing on ice or frozen snow, the chamber 119 can be left without air. Thus the weight of the vehicle will force the rubber part 117 to slide into the walls 118, so that the edges of the walls are left free to cut the ice and snow, thereby advancing the rotor in the direction of its axis. This solution can also be convenient on some kinds of sandy grounds. The compressed air necessary to this operation can enter or exit chamber 119, at will, through the duct 120, the axial bore 121, and a rotating gland through which this bore will be connected to a flexible pipe which, running along the rotor supporting struts, will be connected to the corresponding reservoir and valve set in order to control the air passage.

Figure 29:
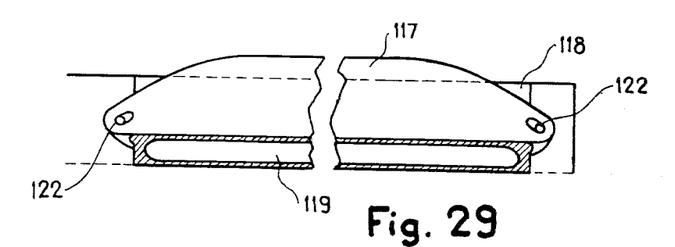
FIGURES 29 and 30 are sections analogous to the section represented in the FIG. 25, but showing the structure of FIG. 28, in extended and retracted conditions, respectively.
Figure 30:
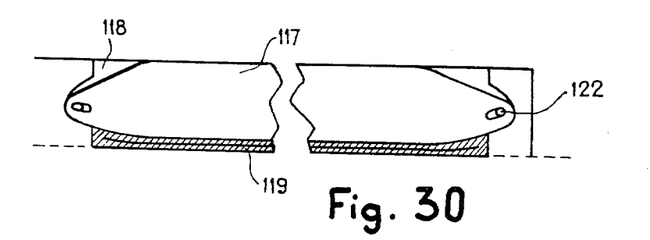
Figure 31:
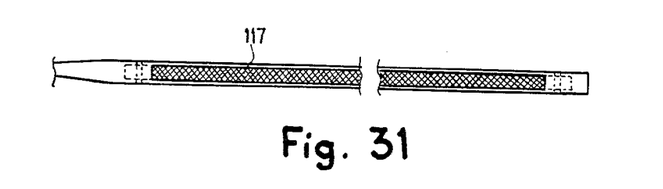
FIGURE 31 is a view analogous to the views of FIGS. 3 and 26, but showing the structure of FIGS. 28, 29 and 30.

Between the supporting bolts 122, on which the ends of rubber parts 117 are attached, and the corresponding holes in 117, there must be a certain clearance, as shown in FIGS. 29 and 30, in order that, when rubber 117 is displaced by sliding between the walls 118, the corresponding relative shifting can be performed without undesirable strain.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. An amphibious vehicle, comprising a body having a water tight hull, a plurality of substantially identical Archimedean screws having longitudinal axes and functioning as propelling rotors for both land and water movements of the vehicle, means mounting said screws below the hull to support the body at an elevated level, means for driving each screw about its own axis, and means for orientating each screw to turn to positions transverse to said body.

2. An amphibious vehicle according to claim 1 wherein said means for driving and orientating each screw include telescoping portions enabling lengthening and shortening the depth of position of each screw with respect to said hull.

3. An amphibious vehicle according to claim 2 having four of said screws arranged in pairs fore and aft of the vehicle, each pair including a screw on each side of the body, and wherein is additionally provided means to coordinate orientation movements of said screws to move the vehicle along a desired course.

4. An amphibious vehicle according to claim 3 wherein said means mounting the screws are struts pivoted on the hull, and wherein is additionally provided means to govern telescoping of said screw drive and orientating means, and means to control lateral swinging of said supporting struts, whereby to counteract rolling movements of the body.

5. An amphibious vehicle according to claim 3 wherein each screw had a cylindrical core with a conical forward end about which are spiraled two helicoidal fins of constant pitch, said fins having logarithmically increasing radii along said conic end and constant radii along the cylindrical portion of the core, the screws mounted on opposite sides of the body having fins spiraled in opposite sense while the screws mounted on the same side of the body having fins spiraled in the same sense, said means for driving the screws rotating screws on opposite sides of the body in opposite sense and screws on the same side of the body in the same sense.

6. An amphibious vehicle according to claim 2 wherein said telescoping portions for each screw are supported in one of said struts, cooperating fin and slot means for prevention of relative turning motion of said portions, the upper portion being rotatable inside the strut, the lower portion being slideable through the lower end of the strut and having its lower end rotatably mounting one of said screws, bearings in said lower portion journaling a shaft for the screw which extends perpendicular to the axis of the strut, and a compression spring inside the upper telescoping portion pressing the lower portion downwardly.

7. An amphibious vehicle, according to claim 6 wherein each said strut has a hollow head at its upper end forming a sealed gear housing in the slides of which are two opposed hollow trunnions, said trunnions being journaled in bearings fixed to said hull to provide a turning axis parallel to the longitudinal symmetry plane of the hull, first and second shafts passing through the hollow axes of said trunnions forming parts of said screw drive and orienting means, one of said first and second shafts being hollow to conduct compressed air to the interior of said gear housing and from thence to the interior of said upper telescoping portion.

8. An amphibious vehicle according to claim 7 having inside and coaxially of said telescoping portions a third rotatable shaft also formed of telescoping parts coupled by slots and fins and forming part of said screw drive means, said third shaft being coupled to said first shaft by a conical pinion and wheel located inside said hollow head of the strut, the lower part of said telescoping third shaft being disposed in said lower telescoping portion and being coupled by a conical gear pair to said screw shaft, a conical wheel fixed to said upper telescoping portion and meshing with a conical pinion fixed to said second shaft to form part of said orientating drive means.

9. An amphibious vehicle according to claim 8 wherein said means for orientating the screws further comprises for each screw a worm wheel fixed to the second shaft outside said trunnion, and steering means for driving said worm wheel.

10. An amphibious vehicle according to claim 8 wherein a passage is formed through said conical wheel fixed to said upper telescoping portion to conduct a pressure fluid to the interior of the upper telescoping portion.

11. An amphibious vehicle according to claim 8 wherein said drive means for the screw further comprises an engine geared to the outer wheel of a first differential gear having two output shafts directed toward opposite sides of the craft, said output shafts being geared to the outer wheels of second and third differential gears each having two shafts coupled respectively to said first shaft entering the hollow heads of the struts supporting the screws on one side of the craft body.

12. An amphibious vehicle according to claim 11 wherein brake means is provided for the shafts from the second and third differential gears which drive the screws disposed at the forward end of the vehicle body.

13. An amphibious vehicle according to claim 9 wherein said worm wheels for orientating said struts positioned on one side of the body are threaded in the same sense while those positioned on the other side of the body are threaded in the opposite sense, the worm wheels for the forward screws being mounted on output shafts of a first differential, and the worm wheels for the rear screws being mounted on output shafts of a second differential, the outer wheels of both said differentials being geared to the output shafts of separate hydraulic motors.

14. An amphibious vehicle according to claim 13 wherein said steering means comprises a steering wheel connected by gears, shafts and couplings to said second shafts on one side of the body in such a way as to drive such shafts in opposite senses, said hydraulic motors being arranged to turn the connected worm wheels on the same side of the body in opposite senses and the worm wheels connected to struts on opposite sides of the body in opposite senses, whereby, turning of the steering wheel causes the forward rotor struts to turn equal angles in the same sense, and also causes the rear struts to turn equal angles in the opposite sense.

15. An amphibious vehicle according to claim 7 wherein each pair of said struts supporting the forward and rear pair of screws are coupled by a transverse extensible bar, said bars being articulated to the struts, each said bar incorporating a piston and cylinder and a double acting slide valve for control of a pressure fluid entry into said cylinder on one side or the other of the piston to expand and compress the bar toward one side or the other, whereby the lateral forces being transmitted by the screws through their supporting struts cause the struts to tilt about said upper longitudinal trunnions in a plane perpendicular to the symmetry plane of the body and actuate said slide valve.

16. An amphibious vehicle according to claim 15, wherein a second and similarly equipped with cylinder, piston and valve extensible bar is articulated to each pair of struts parallel to the first bar, the outlets of the two corresponding double acting slide valves being connected to two hydraulic motors geared to corresponding differential gears in such a way that the variation in the length of each of the two bars, and therefore in the position of the corresponding slide valve, causes the turning of the corresponding hydraulic motor in one sense if the bar lengthens and in the opposite sense if the bar shortens, said motors being so connected to the corresponding pairs of screws as to alter their lateral convergence so as to offset the lateral thrusts causing the extension or construction of the bars, whereby the slide valves in the bars are returned to their middle positions, stopping the passage of fluid to the hydraulic motors when the resultant thrusts from both screws become parallel.

17. An amphibious vehicle according to claim 16 wherein the cylinders of said second extensible bars are each fastened to the hull of said body, the pistons of said second bars each comprising two cylindrical portions rigidly connected to each other by a connecting rod and slideable in opposite directions in said cylinder, said cylinder having a central partition having an opening through which slidingly passes said connecting rod, spring means within said cylinder biasing said two piston portions to remain in a middle position symmetrically on each side of said partition, and means for admitting a pressure fluid to the cylinder on both sides of said partition to shift the piston portions and tilt the connected pair of screw supporting struts.

18. An amphibious vehicle according to claim 17 wherein is additionally provided a tilt stabilizing control device having means sensitive to the trim angle of the craft body, a source of pressure fluid and ducts connecting said source to the cylinders of said extensible bars, said tilt control device being arranged to force pressure fluid to said struts and said extensible bars so as to simultaneously lengthen one strut and shorten the other of a connected pair of struts when the pair is tilted laterally and thereby compensate for and limit rolling motions of the body.

19. An amphibious vehicle according to claim 18 wherein said stabilizing control device includes a pendulum connected to a double acting slide valve which prevents the passage of pressure fluid when the pendulum is in a normal symmetrical position, angular movements of the slide valve with respect to the pendulum causing feed of pressure fluid to one side or the other of said cylinders of said second extensible bars.

20. An amphibious vehicle according to claim 5 wherein said helicoidal fins are each provided with a pneumatic tire in its rim in the zone in which their radii are constant, said tire being tubular and closed at both ends.

21. An amphibious vehicle according to claim 20 wherein each said fin has, in the zone provided with a pneumatic tire, a channel in its peripheral edge, said tire being slideably seated within said channel for radial movements with respect to the screw, said tire normally seating completely within the channel exposing the channel edges for use as a hard rim, and means for moving said tire to emerge partly from the channel for use as a soft rim.

References Cited by the Examiner

UNITED STATES PATENTS

| | | | |
|---|---|---|---|
| 1,672,613 | 6/1928 | Howell | 115—19 |
| 2,432,107 | 12/1947 | Williams | 115—1 |

FOREIGN PATENTS

| | | |
|---|---|---|
| 685,801 | 5/1964 | Canada. |
| 829,067 | 2/1960 | Great Britain. |

MILTON BUCHLER, *Primary Examiner.*

ANDREW H. FARRELL, *Examiner.*